(No Model.)

O. PIHLFELDT.
BALL BEARING FOR VELOCIPEDES.

No. 327,408. Patented Sept. 29, 1885.

WITNESSES
Henry Skerrett
Miles C. Hughes
Both of Birmingham

INVENTOR
Olaf Pihlfeldt

UNITED STATES PATENT OFFICE.

OLAF PIHLFELDT, OF COOKSEY ROAD, SMALL HEATH, NEAR BIRMINGHAM, COUNTY OF WARWICK, ENGLAND.

BALL-BEARING FOR VELOCIPEDES.

SPECIFICATION forming part of Letters Patent No. 327,408, dated September 29, 1885.

Application filed July 6, 1885. (No model.) Patented in England December 15, 1882, No. 5,991.

*To all whom it may concern:*

Be it known that I, OLAF PIHLFELDT, a subject of the King of Norway and Sweden, but residing at 159 Cooksey Road, Small Heath, near Birmingham, in the county of Warwick, England, manufacturer, have invented certain Improvements in Ball-Bearings for Bicycles, Tricycles, and other Velocipedes, (for which I have received Letters Patent in Great Britain, No. 5,991, dated December 15, 1882,) of which the following is a specification.

My invention has reference to ball-bearings for bicycles, tricycles, and other velocipedes; and it consists in means or appliances whereby the anti-friction balls or spheres employed for producing rolling contact can be readily introduced into or withdrawn from the said bearing or parts of the said bearing in a simple and efficient manner, and also in means whereby adjustment can be effected to compensate for wear of the bearing parts and anti-friction balls.

Figure 1:
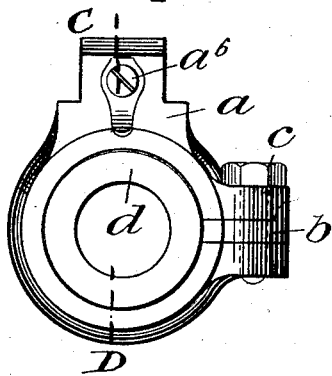
Figure 2:
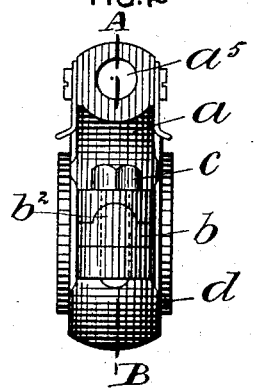
Figure 3:
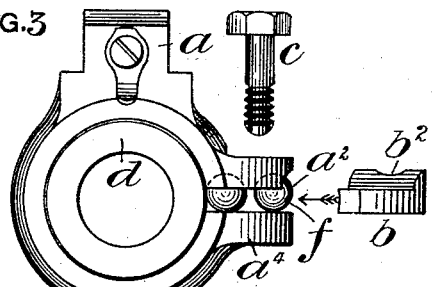
Figure 9:
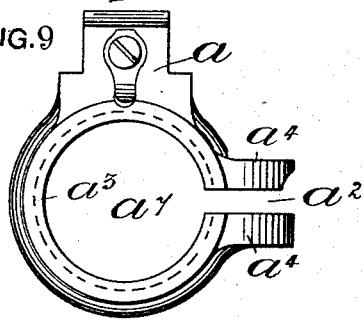
Figures 5, 7:
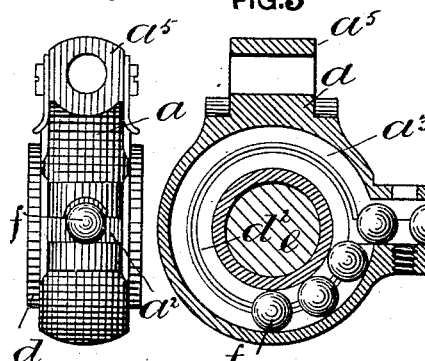
Figure 6:
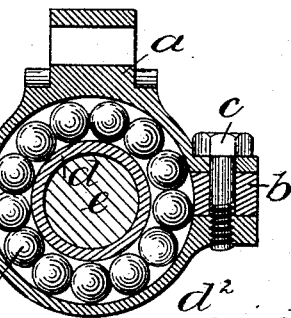
Figure 8:
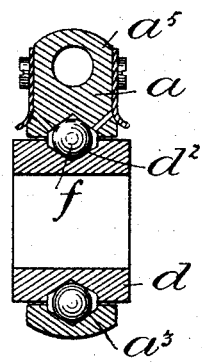
Figure 4:
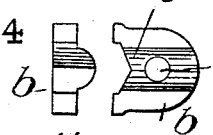
Figure 10:
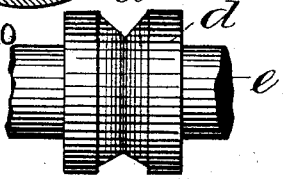

Figure 1 is a front elevation, and Fig. 2 is an end view, of a ball-bearing constructed according to my invention. Fig. 3 is a like view of Fig. 1, but showing how the balls or spheres are introduced into the opposite annular grooves in the bearing by the removal of a side-closer and a screw-pin. Fig. 4 is an end view and plan of the said closer or filling-in piece. Fig. 5 is also a vertical section of the bearing, the same as in Fig. 3, showing the introduction of the balls through the side aperture. Fig. 6 is also a vertical section of Fig. 1 on the dotted lines A B, Fig. 2, the balls being shown in position and the transverse gap or opening closed by the filling-in piece. Fig. 7 is an edge view of Fig. 5, and Fig. 8 is a transverse section of Fig. 1 on the dotted lines C D. Fig. 9 is the bearing separately with the bush removed, and Fig. 10 is an edge view of the said bush or inner bearing.

The same letters of reference indicate corresponding parts in the several figures of the drawings.

$a$ is the case or ring-like frame of the ball-bearing, which is split or divided transversely at one side and marked $a^2$. This split or divided part is for the purpose of gaining access to the annular groove $a^3$, running upon the inside edge of the frame. This ring or frame terminates in lugs $a^4 a^4$, and the gap between the said lugs is closed by a filling-in piece, $b$, as best seen in Fig. 6. The frame or ring of the bearing is connected to the machine by a knuckle or lug joint, $a^5$.

$a^6$ are lubricator-passage closers, and through the passages oil is introduced for lubricating the parts.

$c$ is a screw-bolt which affixes the closer $b$ within the gap $a^2$ by the pin passing through the lugs $a^4$ and through the said closer.

$d$ is a sleeve or bush which works in the concentric or middle $a^7$ of the bearing $a$, and $d^2$ is an angular groove running around the said bush—that is, the channel or groove is formed V-shaped, so that the spheres touch only at two opposite points. The annular groove $a^3$ in the bearing $a$ is of a corresponding shape to the groove $d^2$ of the bush $d$.

$e$ is the shaft of the traveling wheel or wheels, and upon this said shaft the sleeve $d$ is affixed. In other words, the bearing consists of a ring or casing of metal, $a$, gapped or left open on its side $a^2$, through which opening the spheres $f$, to constitute the rolling bearing-surfaces, are introduced. This gapped opening or passage is terminated by parallel lugs $a^4$, and through these lugs a transverse screw-pin, $c$, passes for affixing the closing-piece $b$ in position within the opening $a^2$, or between the lugs $a^4$, so that by the filling up of the opening by the closer $b$ after the introduction of the spheres into the bearing the perfect continuity of the case and bearing-surface is thereby accomplished; and working within the opening $a^7$ of the bearing is a sleeve or bush, $d$, affixed upon the shaft $e$, carrying the wheel or wheels of the machine. The bearing $a$ and the bush $b$ have each annular grooves $a^3$ $d^2$. These grooves or channels are angular or V-shaped in cross-section, for the purpose of reducing the frictional contact of the balls; and it will be observed that when the bush $d$ is placed within the opening $a^7$ of the bearing $a$, so that the groove or channel of the one, on becoming coincident with the groove or channel of the other, forms an annular space of about the depth of a ball, and by the said grooves being angular a V-space is also left, wherein the lubricant is stored.

To put the parts together with the balls presented to their respective bearing-surfaces, place the bush $d$, with its axle $a$, into the opening $a^7$ of the bearing $a$, and when the channels or grooves $a^3$ $d^2$ are coincident the balls or spheres $f$ can be introduced through the split or opening $a^2$, as represented in Figs. 3 and 5; and when the annular space inclosed between the inside and outside bearing-surfaces have been filled up with the balls or spheres described the closer $b$ is then introduced into gap $a^2$ and the screw-pin $c$ passed through the eyes or holes in the lugs, and also through the hole $b^2$ in the closer; and on the bolt being fully screwed home the parts are firmly and securely locked and held in position, as represented in Figs. 1, 2, 6, and 8.

On the wearing away of the balls and bearing-surfaces by frictional contact, it is only necessary to grind or reduce the depth of the closer $b$ in order that the bearing parts may be brought closer together by the tightening up of a nut or screw-pin. Thus wear is compensated for by slightly reducing the size of the closer, when the parts are by a simple and efficient means brought up to their bearing-surfaces.

The closer $b$ is provided on its upper side with a semicircular rib formation (marked $b^3$) for preventing lateral displacement.

I claim—

In ball-bearings for bicycles, tricycles, and other vehicles, the ring or casing $a$, adapted for the reception of balls, and formed with the gap or opening $a^2$, for the insertion of said balls, and the lugs $a^4$, embracing said gap, in combination with the block or closer $b$, fitting said gap or opening and fastened to the lugs $a^4$ by means of the screw-bolt $c$, substantially as described.

Signed this 9th day of June, 1885.

OLAF PIHLFELDT.

Witnesses:
HENRY SKERRETT,
MILES E. HUGHES.